Patented July 7, 1953

2,644,812

UNITED STATES PATENT OFFICE 2,644,812

CUPRIFEROUS POLYAZO DYESTUFFS

Hans Ruckstuhl and Walter Wehrli, Basel, Switzerland, assignors to Sandoz A. G., Basel, Switzerland, a Swiss firm No Drawing. Application December 3, 1951, Serial No. 259,692. In Switzerland December 7, 1950

6 Claims. (Cl. 260—145)

The present invention relates to polyazo dyestuffs.

A primary object of the invention is the embodiment of a group of polyazo dyestuffs characterized by superior affinity for textile fibers, especially cotton and regenerated cellulose, and by their ability to yield dyeings in light-fast and wash-fast bluish shades.

This object is realized, according to the present invention, by the copper complex compounds of the group of polyazo dyestuffs which correspond to the formula

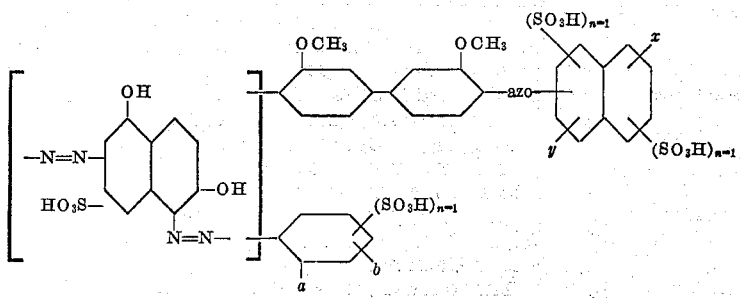

wherein $a$ stands for a carboxy, methoxy or hydroxy group, $b$ stands for hydrogen, a lower alkyl group, an —N=N—mononuclear aryl radical or a nitro group, $x$ stands for hydrogen, OH, NH₂, alkylated NH₂, acylated NH₂ or sulfo, $y$ stands for an OH group in ortho-position to —azo—, one $n$ is the integer 2 and the other $n$'s are the integers 1 or 2, and which contain at least 3 atoms of copper to the molecule.

These copper complex compounds may also be defined as cupriferous derivatives of polyazo dyestuffs which correspond to the formula

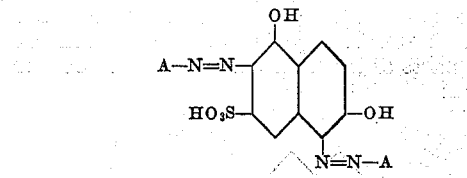

wherein one A is an

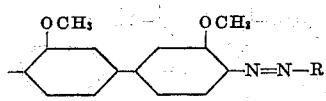

group and the other A is a radical of the benzene series which, in ortho-position to the azo group, is substituted by a —COOH, —OCH₃ or —OH group, and which may bear further substituents, including arylazo groups, and wherein R stands for the radial of a monohydroxy- or dihydroxynaphthalene-mono-, -di- or -trisulfonic acid, coupled in ortho-position to hydroxy, or for the radical of an aminohydroxynaphthalene-mono- or -di-sulfonic acid, the amino group of which may be alkylated, arylated or acylated.

A desired copper complex compound, according to the present invention, is obtained by combining the diazo compound of an appropriate amine of the formula

A—NH₂ with an appropriate azo dyestuff of the formula

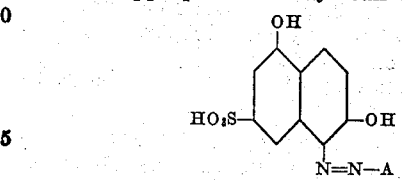

or with the copper complex compound of the latter, or by combining the diazo compound of the amine of the formula

A—NH₂ with the corresponding azo dyestuff of the formula

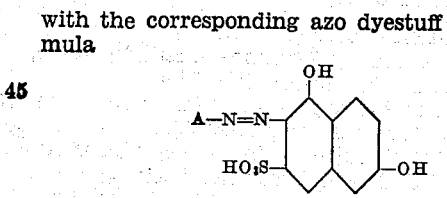

or with the copper complex compound of the latter, A having in each case the previously-indicated significance, and then subjecting the resultant polyazo dyestuff to a demethylating coppering.

Illustrative R radicals are the radicals of, for example:

1-hydroxynaphthalene-4-sulfonic acid,
2-hydroxynaphthalene-4-sulfonic acid,
2-hydroxynaphthalene-6-sulfonic acid,
1-hydroxynaphthalene-3,6-disulfonic acid,
2-hydroxynaphthalene-3,6-disulfonic acid,
1-hydroxynaphthalene-3,8-disulfonic acid,
1-hydroxynaphthalene-3,6,8-trisulfonic acid,
2 - acetylamino - 5 - hydroxynaphthalene - 7-sulfonic acid,
2 - benzoylamino - 5 - hydroxynaphthalene - 7-sulfonic acid,
2 - methylamino - 5 - hydroxynaphthalene - 7-sulfonic acid,
2 - phenylamino - 5 - hydroxynaphthalene - 7-sulfonic acid,
1 - phenylamino - 8 - hydroxynaphthalene - 4-sulfonic acid,
2 - phenylamino - 8 - hydroxynaphthalene - 6-sulfonic acid,
1 - acetylamino - 8 - hydroxynaphthalene - 3,6-disulfonic acid,
1 - benzoylamino - 8 - hydroxynaphthalene - 4,6-disulfonic acid,
2 - acetylamino - 8 - hydroxynaphthalene - 3,6-disulfonic acid,
1,8 - dihydroxynaphthalene - 3,6 - disulfonic acid, etc.

Illustrative A aryl radicals which, in ortho-position to the azo group, are substituted by a —COOH, —OCH₃ or —OH group, are the radicals of, for example:

2-amino-1-hydroxy-benzene-4-sulfonic acid,
2-amino-1-hydroxy-benzene-5-sulfonic acid,
2-amino-1-methoxybenzene,
2-amino-1-methoxy-4-methylbenzene,
2-amino-1-methoxy-5-chlorobenzene,
2-amino-1-methoxy-5-nitrobenzene,
2-amino-1-methoxybenzene-4-sulfonic acid,
2-amino-1-methoxy - 5 - nitrobenzene-4-sulfonic acid,
2-amino - 1 - methoxy - 5 - chlorobenzene-4-sulfonic acid,
2-aminobenzene-1-carboxylic acid,
2-amino-5-nitrobenzene-1-carboxylic acid,
2-amino-5-chlorobenzene-1-carboxylic acid,
2-amino-1-carboxybenzene-4-sulfonic acid,
2-amino-1-carboxybenzene-5-sulfonic acid,
4 - amino - 4' - hydroxy-1,1'-azobenzene-3,3'-dicarboxylic acid,
4 - amino-4'-hydroxy - 3 - methoxy-1,1'-azobenzene-3'-carboxylic acid, etc.;

also monoazo dyestuffs prepared by coupling diazotized aminobenzene-monosulfonic acids or -disulfonic acids or diazotized aminonaphthalene-monosulfonic acids or -disulfonic acids with 1-amino-2-methoxybenzene or substitution products thereof which are capable of coupling, for instance the following dyestuffs:

1-aminobenzene-4-sulfonic acid→
　　1-methoxy-2-amino-4-methylbenzene,
1-aminobenzene-2,5-disulfonic acid→
　　1-methoxy-2-amino-4-methylbenzene,
1-aminonaphthalene-4-sulfonic acid→
　　1-methoxy-2-amino-4-methylbenzene,
2-aminonaphthalene-4,8-disulfonic acid→
　　1-methoxy-2-amino-4-methylbenzene,
etc.

The monoazo or disazo dyestuffs serving as coupling components for the preparation of the polyazo dyestuffs can be prepared, on the one hand, from the corresponding J-acid dyestuffs by replacement of the amino group by an hydroxyl group or, on the other hand, by coupling with 2,5-dihydroxynaphthalene-7-sulfonic acid, whilst the monoazo dyestuffs corresponding to the formula

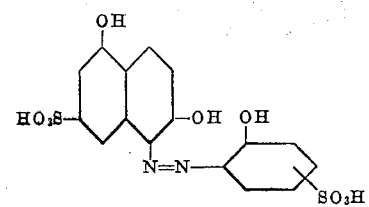

are preferably prepared by acid coupling of a diazotised aminobenzene sulfonic acid with a 2-amino-5-acyloxy-naphthalene - 7 - sulfonic acid, replacement of the amino group of the naphthalene radical by a hydroxyl group, introduction of a hydroxyl group into the benzene radical by an oxidative coppering and splitting off the acyl radical in the acyl-oxy group of the naphthalene radical.

For further coupling, it is advantageous to employ the coupling components in the form of the copper complex compound.

The obtained polyazo dyestuffs are treated with copper-yielding agents until the methoxy groups are split, and the dyestuffs are converted into the copper complexes.

Coppering of the dyestuffs can be carried out according to various methods which per se are known from the literature, for example, by heating in weakly alkaline aqueous agents with copper tetramine hydroxide complex, optionally in the presence of an organic base, or in a fusion of alkali metal salts of low-molecular aliphatic monocarboxylic acids with copper salts.

The polyazo dyestuffs obtained according to the present invention dye cotton and regenerated cellulose in marine-blue to blue-green shades. The resultant dyeings possess an outstanding affinity for the fiber and have a very good fastness to light and to washing.

The following examples set forth representative exemplary embodiments of the invention, and these examples are intended to be solely illustrative and not at all limitative. In these examples, the parts and percentages are by weight and the temperatures are expressed in degrees centigrade. The term "soda" as hereinafter employed refers to sodium carbonate.

*Example 1*

The tetrazo compound from 24.4 parts of 3,3'-dimethoxy-4,4'-diamino - 1,1' - diphenyl is subjected to alkaline coupling in per se conventional manner with 30.4 parts of 1-hydroxynaphthalene-3,8-disulfonic acid. The resultant intermediate is run into a solution of the sodium salt of 46.8 parts of the monoazo dyestuff of the composition:

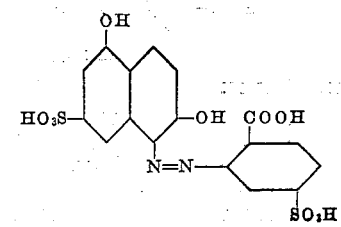

in 500 parts of water, 500 parts of pyridine and 50 parts of aqueous ammonia of 25% strength. Upon conclusion of the coupling, the trisazo dyestuff is isolated and subjected to demethylating coppering in substance according to per se conventional methods.

In the dry state, the copper complex of the dyestuff is a dark powder which dissolves in water with a blue coloration and in concentrated sulfuric acid with blue-green coloration, and dyes cotton in fast marine-blue shades. It corresponds to the composition:

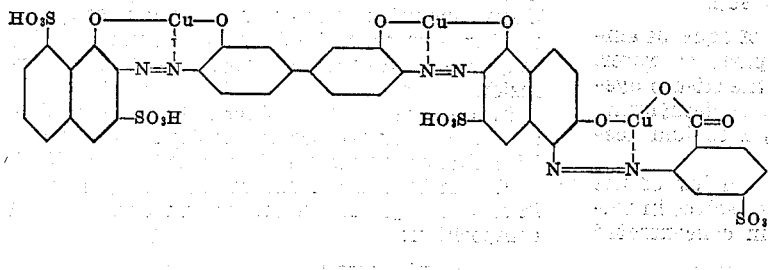

Example 2

The tetrazo compound from 24.4 parts of 3,3'-dimethoxy-4,4'-diamino-1,1'-diphenyl is subjected to soda-alkaline coupling in per se conventional manner with 30.4 parts of 1-hydroxynaphthalene-3,8-disulfonic acid. The resultant intermediate is added to a solution of 49.5 parts of the copper complex of the monoazo dyestuff of the composition:

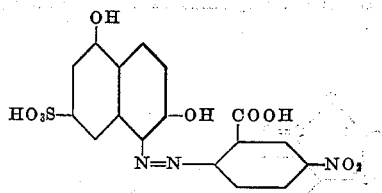

500 parts of pyridine and 50 parts of aqueous ammonia of 25% strength in 500 parts of water. Upon conclusion of the coupling, the trisazo dyestuff is isolated and subjected to demethylating coppering in per se conventional manner with ammoniacal copper oxide in aqueous solution in presence of an organic base at 95°.

In the dry state, the copper complex of the dyestuff is a dark powder which dissolves in water with a blue coloration and in concentrated sulfuric acid with blue-green coloration, and dyes cotton in fast marine-blue shades. It corresponds to the composition:

Example 3

The tetrazo compound from 24.4 parts of 3,3'-dimethoxy-4,4'-diamino-1,1'-diphenyl is subjected to soda-alkaline coupling in per se conventional manner with 30.4 parts of 1-hydroxynaphthalene-3,8-disulfonic acid. The resultant intermediate is added to a solution of 45 parts of the copper complex of the monoazo dyestuff of the composition:

500 parts of pyridine and 50 parts of aqueous ammonia of 25% strength in 500 parts of water. Upon conclusion of the coupling, the trisazo dyestuff is isloated and subjected to demethylating coppering in per se conventional manner with ammoniacal copper oxide in aqueous solution in presence of an organic base at 95°.

In the dry state, the copper complex of the dyestuff is a dark powder which dissolves in water with a blue coloration and in concentrated sulfuric acid with a blue-green coloration, and dyes cotton in fast marine-blue shades. It corresponds to the composition:

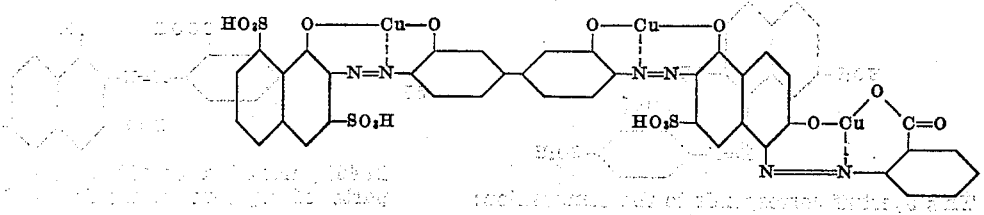

Example 4

The tetrazo compound from 24.4 parts of 3,3'-dimethoxy-4,4'-diamino-1,1'-diphenyl is subjected to soda-alkaline coupling in per se conventional manner with 30.4 parts of 1-hydroxynaph-

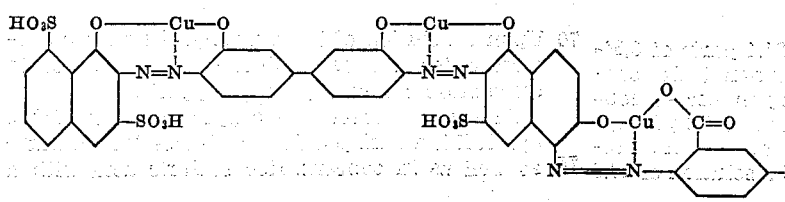

thalene-3,6-disulfonic acid. The resultant intermediate is added to a solution of 53 parts of the copper complex of the monoazo dyestuff of the composition:

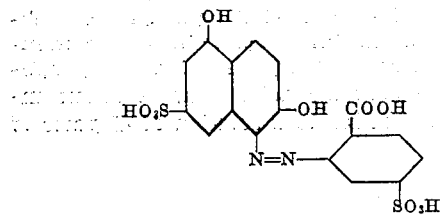

500 parts of pyridine and 50 parts of aqueous ammonia of 25% strength in 500 parts of water. Upon conclusion of the coupling, the trisazo dyestuff is isolated and subjected to demethylating coppering with copper sulfate in a sodium acetate fusion.

In the dry state, the copper complex of the dyestuff is a dark powder which dissolves in water with a blue coloration and in concentrated sulfuric acid with blue-green coloration, and dyes cotton in fast marine-blue shades. It corresponds to the composition:

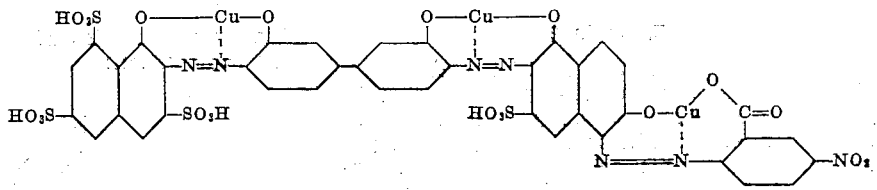

A marine-blue dyestuff with similar properties is obtained in entirely analogous manner when the precedingly-mentioned intermediate is coupled with the copper complex of the monoazo dyestuff of the composition:

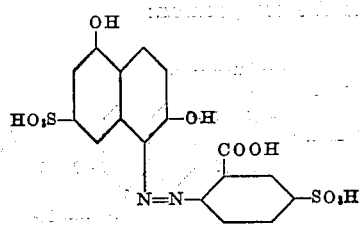

This dyestuff corresponds to the composition:

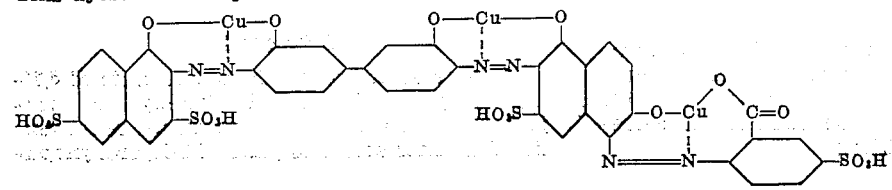

Example 5

The tetrazo compound from 24.4 parts of 3,3'-dimethoxy-4,4'-diamino-1,1'-diphenyl is subjected to soda-alkaline coupling in per se conventional manner with 38.4 parts of 1-hydroxynaphthalene-3,6,8-trisulfonic acid. The resultant intermediate is added to a solution of 49.5 parts of the copper complex of the monoazo dyestuff of the composition:

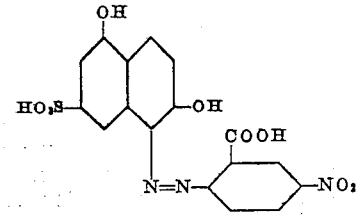

500 parts of pyridine and 50 parts of aqueous ammonia of 25% strength in 500 parts of water. Upon conclusion of the coupling, the trisazo dyestuff is isolated and subjected to demethylating coppering with copper sulfate in a sodium acetate fusion.

In the dry state, the copper complex of the dyestuff is a dark powder which dissolves in water with blue coloration and in concentrated sulfuric acid with blue-green coloration, and dyes cotton in fast blue-green shades. It corresponds to the composition:

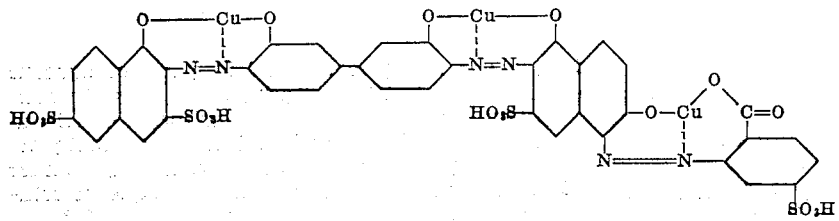

Example 6

The tetrazo compound from 24.4 parts of 3,3'-dimethoxy-4,4'-diamino-1,1'-diphenyl is subjected to alkaline coupling in per se conventional manner with 38.4 parts of 1-hydroxynaphthalene-3,6,8-trisulfonic acid. The resultant intermediate is run into a solution of the copper complex from 38.8 parts of the monoazo dyestuff of the composition:

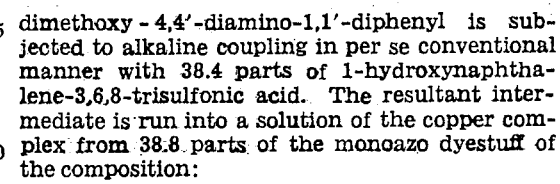

in 400 parts of water, 400 parts of pyridine and 50 parts of aqueous ammonia of 25% strength.

Upon conclusion of the coupling, the trisazo dyestuff is isolated and subjected in substance to conventional demethylating coppering.

In the dry state, the copper complex of the dyestuff is a dark powder which dissolves in water as well as in concentrated sulfuric acid with a blue coloration, and dyes cotton in fast marine-blue shades. It corresponds to the composition:

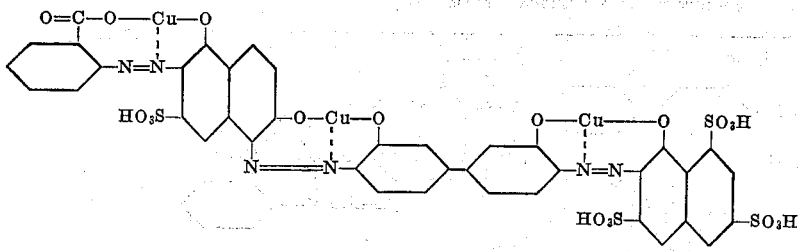

Example 7

The diazo compound from 24.8 parts of 5-nitro-2-amino-1-methoxybenzene-4-sulfonic acid is allowed to run into a solution of the sodium salt from 82.6 parts of the disazo dyestuff of the composition:

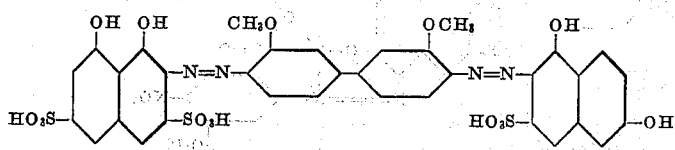

in 800 parts of water, 800 parts of pyridine and 50 parts of aqueous ammonia of 25% strength. Upon conclusion of the coupling, the trisazo dyestuff is isolated and subjected in substance to demethylating coppering.

In the dry state, the copper complex of the dyestuff is a dark powder which dissolves in water with a blue coloration and in concentrated sulfuric acid with blue-green coloration, and dyes cotton in fast marine-blue shades. It corresponds to the composition:

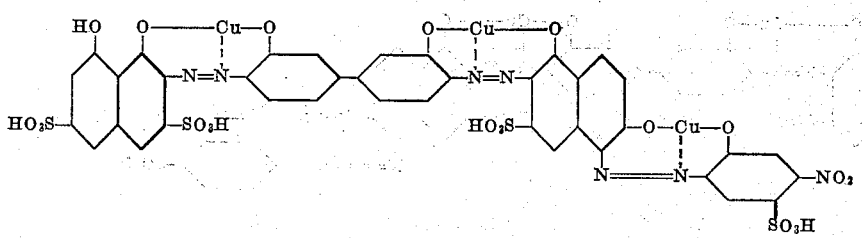

Example 8

The diazo compound from 30.1 parts of the monoazo dyestuff of the composition:

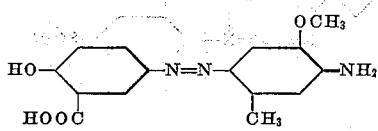

is added in solid form to a solution of the sodium salt from 89 parts of the disazo dyestuff of the composition:

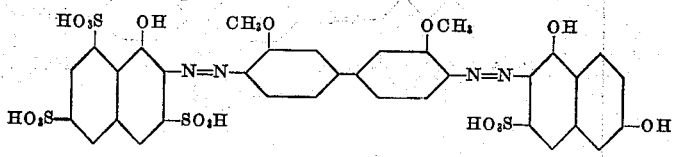

in 800 parts of water, 800 parts of pyridine and 50 parts of aqueous ammonia of 25% strength. Upon conclusion of the coupling, the tetrakisazo dyestuff is isolated and subjected in substance to conventional demethylating coppering.

In the dry state, the copper complex of the dyestuff is a dark powder which dissolves in water with a blue coloration, and dyes cotton in fast greenish gray shades. It corresponds to the composition:

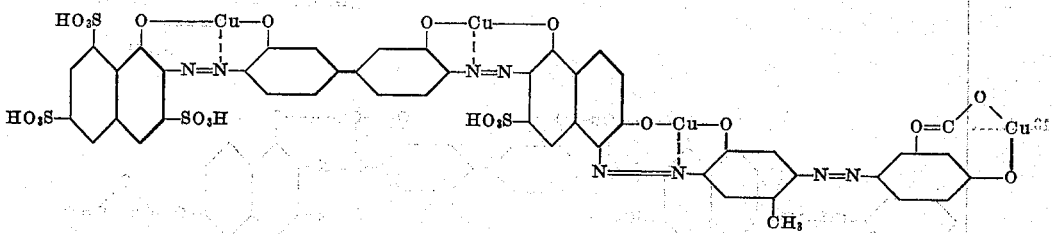

The following table sets forth examples of additional dyestuffs which can be prepared in manner entirely analogous to the foregoing examples from equivalent amounts of corresponding reactants, which are evident from the following formulae which show the copper complex compounds prepared in substance by demethylating coppering. The shade of the dyeing on cotton is, in each case, marine-blue.

| Example No. | Formula of Copper Complex Compound |
|---|---|
| 9 | *(structure)* |
| 10 | *(structure)* |
| 11 | *(structure)* |
| 12 | *(structure)* |
| 13 | *(structure)* |
| 14 | *(structure)* |
| 15 | *(structure)* |

| Example No. | Formula of Copper Complex Compound |
|---|---|
| 16 | |
| 17 | |
| 18 | |
| 19 | |
| 20 | |

*Phenyl nucleus I may be substituted by methyl, methoxy or carboxy, the resultant products being similar in properties to that of Example 20.

Example 21

20 parts of the dyestuff obtained according to Example 2 are dissolved in 30,000 parts of water and, after addition of 300 parts of Glauber salt, 1000 parts of cotton are entered at 30°, whereupon the dyebath is heated to boiling in the course of 30 minutes. Boiling is continued for 15 minutes, the bath then allowed to cool to 50°, and the dyed material withdrawn, rinsed and dried.

Example 22

The tetrazo compound from 24.4 parts of 3,3'-dimethoxy - 4,4' - diamino-1,1'-diphenyl is subjected to alkaline coupling in per se conventional manner with 30.4 parts of 1-hydroxynaphthalene-3,6-disulfonic acid. The resultant intermediate is run into a solution of the sodium salt of 50.2 parts of the copper complex compound the monoazo dyestuff corresponding to the formula

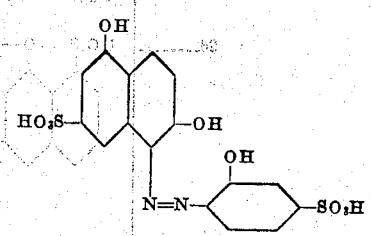

in 250 parts of pyridine, 50 parts of aqueous ammonia of 25% strength and 500 parts of water.

Upon conclusion of the coupling, the trisazo dyestuff is isolated and subjected to demethylating coppering in substance according to per se conventional methods.

In the dry state, the copper complex of the dyestuff is a dark powder which dissolves in water with a blue, in concentrated sulfuric acid with a blue-green coloration, and dyes cotton in fast marine-blue shades. It corresponds to the composition:

component, by the copper complex compound of the monoazo dyestuff of the composition:

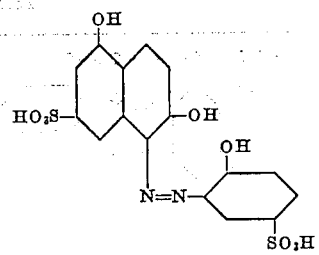

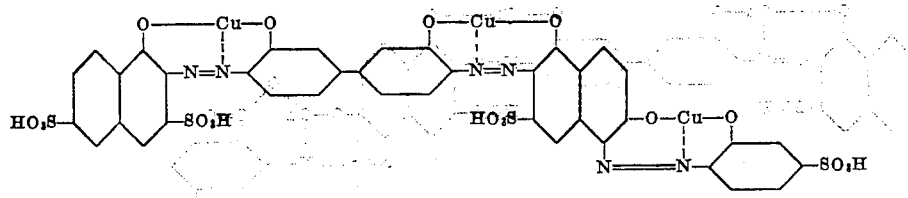

Example 23

A similar dyestuff corresponding to the formula:

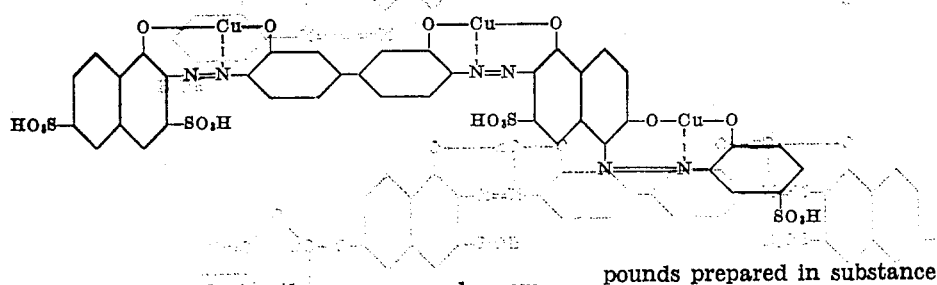

is obtained by replacing the copper complex compound of Example 22 serving as second coupling component, by the copper complex compound of the monoazo dyestuff of the composition:

The following table sets forth examples of additional dyestuffs which can be prepared in manner entirely analogous to Examples 22 and 23 from equivalent amounts of corresponding reactants, which are evident from the following formulae which show the copper complex compounds prepared in substance by demethylating coppering. The shade of the dyeing on cotton is, in each case, marine-blue.

| Example No. | Formula of Copper Complex Compound |
|---|---|
| 24 | |
| 25 | |
| 26 | |

Having thus disclosed the invention, what is claimed is:

1. A copper complex compound of a polyazo dyestuff containing at least three and at most four sulfonic acid groups and corresponding to the formula

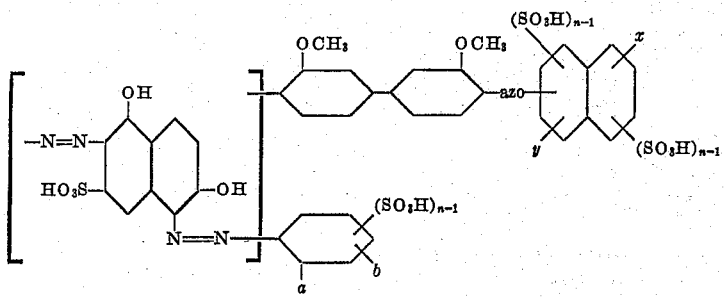

wherein $x$ stands for a member selected from the group consisting of hydrogen, OH, $NH_2$, alkylated $NH_2$, arylated $NH_2$, acylated $NH_2$ and $SO_3H$, $y$ stands for OH in ortho-position to —azo—, $a$ stands for a copperizing group selected from the class consisting of COOH, $OCH_3$, and OH, $b$ stands for a member selected from the group consisting of hydrogen, lower alkyl, —N=N— mononuclear aryl and $NO_2$, one $n$ is the integer 2, and each other $n$ is one of the integers 1 and 2.

2. The polyazo dyestuff corresponding to the formula

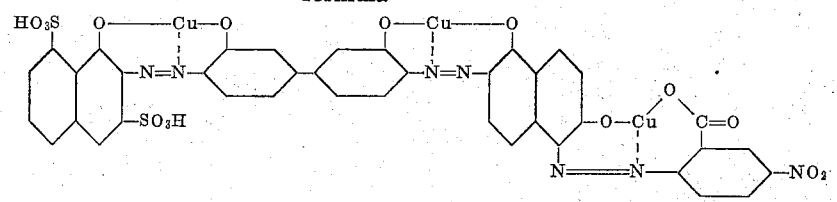

3. The polyazo dyestuff corresponding to the formula

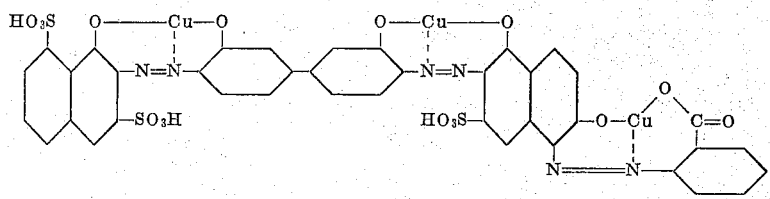

4. The polyazo dyestuff corresponding to the formula

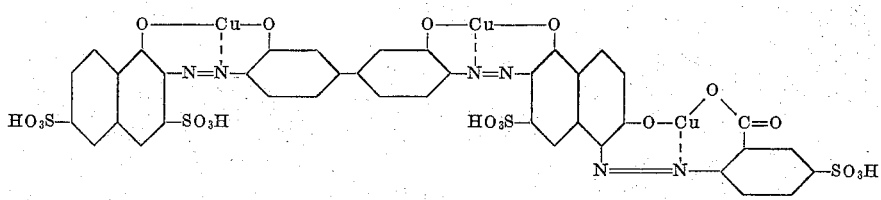

5. The polyazo dyestuff corresponding to the formula

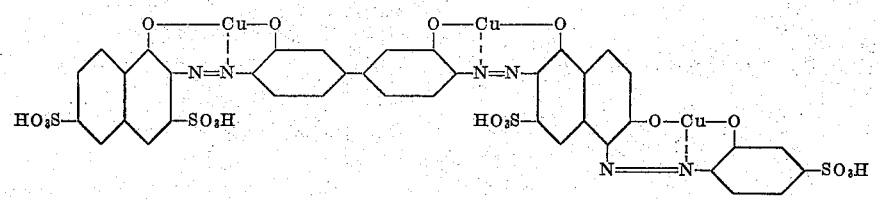

6. The polyazo dyestuff corresponding to the formula

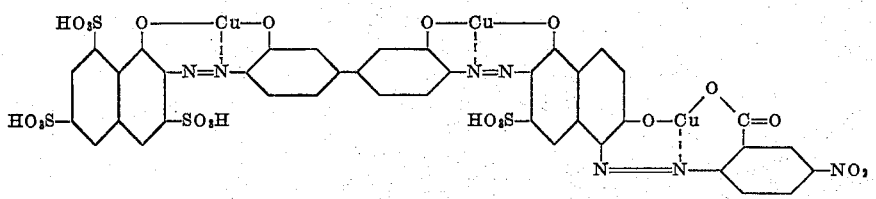

HANS RUCKSTUHL.
WALTER WEHRLI.

References Cited in the file of this patent

UNITED STATES PATENTS

| Number | Name | Date |
|---|---|---|
| 2,370,500 | Sparks | Feb. 27, 1945 |